Figure 1:
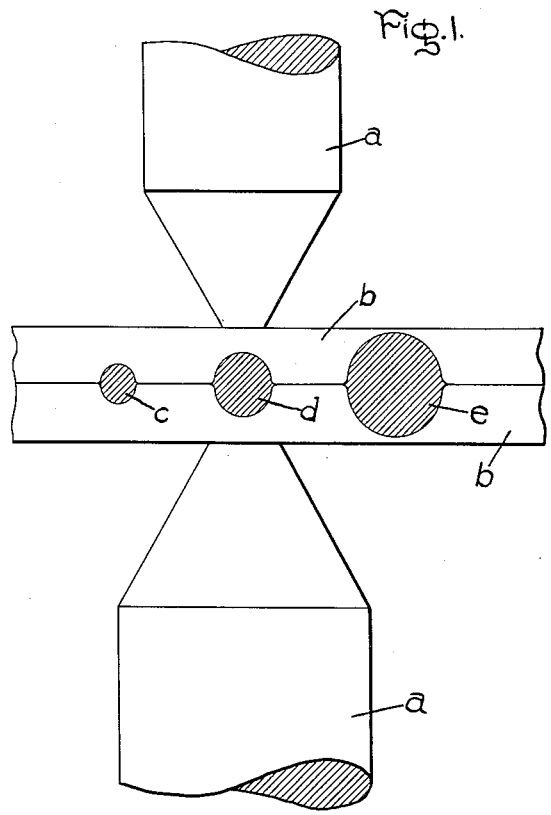

May 8, 1928.

W. HÖPP 1,669,126

SPOT WELDING

Filed Feb. 7, 1927

Inventor:
Wilhelm Höpp,
by
His Attorney.

Patented May 8, 1928.

1,669,126

UNITED STATES PATENT OFFICE.

WILHELM HÖPP, OF HEILIGENSEE, GERMANY, ASSIGNOR TO GENERAL ELECTRIC COMPANY, A CORPORATION OF NEW YORK.

SPOT WELDING.

Application filed February 7, 1927, Serial No. 166,449, and in Germany February 23, 1926.

My invention relates to a method of producing invisible and at the same time good permanent welding spots and seams, particularly on fine sheet material.

I have found that spot welding without tempering colors and incandescent zones can be obtained if a very high density of energy is maintained in the actual welding zone for so short a period of time that the heat can not extend far into the surrounding parts.

As is well known, the electric energy within a conductor is proportional to the square of the current density and the specific resistance of the conductor measured in the direction of the current. The heating occurring at any point corresponds to the concentration of energy at such point. Thus with certain kinds of work a high concentration of energy may be maintained in the actual welding zone by suitably selecting the welding pressure. This is possible when welding iron sheets between pure copper electrodes since the transition resistance between the iron sheets is considerably greater than between the copper electrodes and the sheets. The concentration of energy in the sheet itself is small compared with that due to the contact transition resistance between the sheets. Consequently in this particular instance a high concentration of energy is obtained at the points of contact of the sheets without resorting to artificial means between the plates for creating this condition.

In some cases the difference of resistance at the electrodes compared with the resistance at the sheet juncture will not be great enough to obtain invisible welding spots. For example, on welding brass with nickeled external surfaces, the resistance at the electrodes is very high compared with the resistance at the sheet juncture. In order to secure the desired effect according to my invention in such cases it is necessary to produce an artificial increase in the juncture resistance by coating the contacting surfaces with a layer of some poor conducting material. For this purpose I preferably use materials which act in a reducing manner during the heating, such as finely divided carbon in the form of charcoal or graphite in a suitable solution.

In order to prevent any great conduction of heat into the surrounding parts and particularly to the outside surface of the sheets, it is necessary to use a current sufficient to concentrate a very great amount of energy and to allow this energy to act for a time so short that the local liquefying of material taking place, or the discoloring action due to the welding operation does not extend to the outside surfaces of the sheets. This result is accomplished by proportioning the current, pressure and resistance so as to complete the welding operation within about 1/100 second or less. This extremely short interval of current application may be secured by using a suitable quick acting circuit breaker. Such high speed circuit breakers are now coming into use in other branches of the electrical industry for protecting electrical apparatus. Such a quick acting circuit breaker makes possible even with the thinnest of sheets a concentration of the welding zone between the sheets to an approximately spherical shape of a diameter as small as desired.

On welding thicker sheets or in case greater strength of the welding seam is demanded, it is desirable to avoid internal material stresses occurring at the edge of the sharply delimited welding zone by a subsequent annealing action. This may be effected by applying to the parts after the welding operation an amount of current sufficient to maintain the weld at a red heat. As a result of such treatment each welding zone will be surrounded by a zone in which the material stresses are balanced.

Figure 2:
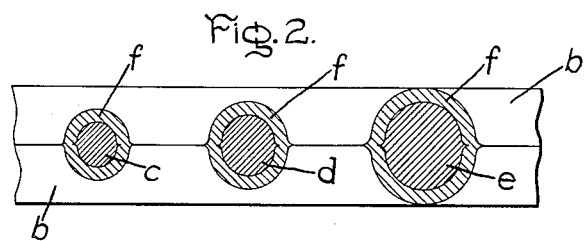

In the drawing, Fig. 1 shows welding spots produced by the above described welding method without heated or annealing zones, and Fig. 2 welds with such zones.

In Fig. 1 the welding electrodes are represented at $a$ in contact with sheets $b$ and the welding zones at $c$, $d$, and $e$. These zones are shown of different sizes to illustrate the effect of increasing the current value. The diameters of the spherical zones of welding increase with the current until finally visible points or heat rings rise on the surface the size of which can be regulated according to requirements.

In Fig. 2 the result of the above described annealing operation is indicated. Each welding zone is surrounded by a zone $f$, in which the material stresses are balanced, as shown in the figure.

By my method of welding, the output capacity is increased and a marked economy effected on account of the suppression of heat losses by conduction. There is also this further advantage. In non-automatic welding or with the previous sluggish cutout devices, a certain amount of inductance in the circuit was found to be necessary, particularly with thin sheets because otherwise irregularities in the transition resistance produced too much or too little heating of the spots on account of current fluctuations. With a quick acting or high speed circuit breaker on the other hand these differences are equalized to a greater extent by an automatic adjustment of the natural time.

What I claim as new and desire to secure by Letters Patent of the United States, is:

1. The method of producing a spot weld between metal parts which consists in maintaining the transition resistance between the parts at a considerably greater value than the transition resistance between the electrodes and the parts and applying a welding current sufficient to produce a high concentration of energy at the welding juncture between the parts and effect the weld with extreme quickness and applying such current for so brief a period of time that the local liquefaction of the material at the welding juncture and the concurrent discoloring action due to the welding action does not extend to the outside surfaces of the parts.

2. The method of producing a spot weld between metal parts which consists in maintaining the transition resistance between the parts at a considerably greater value than the transition resistance between the electrodes and the parts and applying a welding current of sufficient value to effect the weld in about 1/100 second and discontinuing such current application at the end of such period of time whereby the local liquefaction of the material and the concurrent discoloring action due to the welding operation do not extend to the outside surfaces of the parts.

3. The method of producing a spot weld between metal parts which consists in maintaining the transition resistance between the parts at a considerably greater value than the transition resistance between the electrodes and the parts, applying a welding current of such high concentration and for such short interval of time that the liquefaction of the material and the concurrent discoloring action at the welding zone do not extend to the outside surfaces of the parts and thereafter applying to the said parts a lesser amount of current to maintain the weld at a red heat to avoid internal material stresses at the edge of the welding zone.

In witness whereof, I have hereunto set my hand this 13th day of January 1927.

WILHELM HÖPP.